March 9, 1948. H. ULANET 2,437,488
THERMAL CONTROL FOR GLUING STRUCTURAL ASSEMBLIES AND OTHER PURPOSES
Filed Dec. 29, 1944
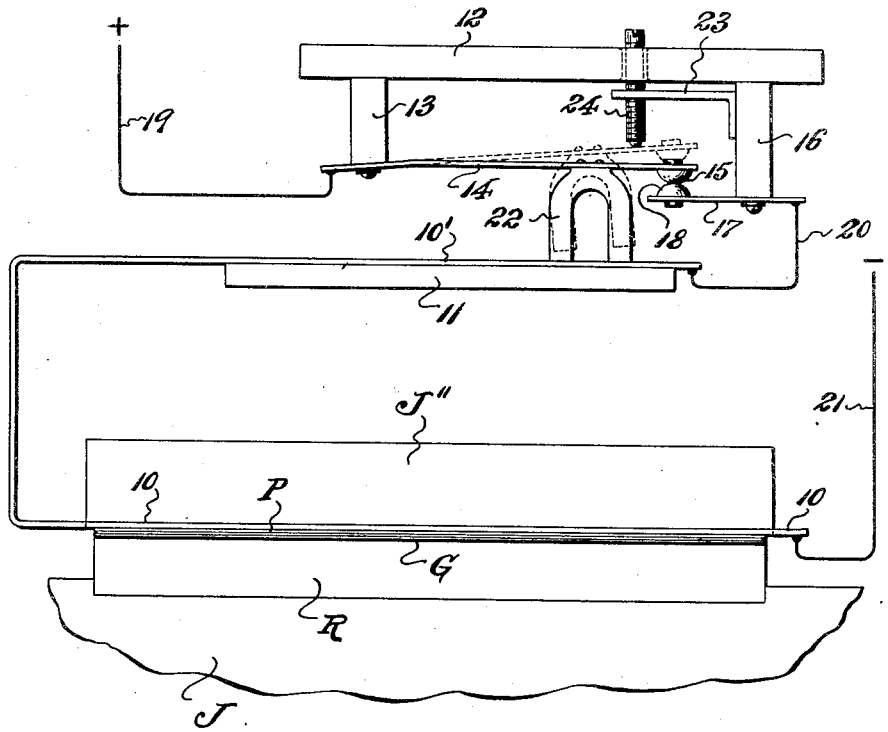
INVENTOR.
Herman Ulanet,
BY George D. Richards,
Attorney Patented Mar. 9, 1948

2,437,488

UNITED STATES PATENT OFFICE 2,437,488

THERMAL CONTROL FOR GLUING STRUCTURAL ASSEMBLIES AND OTHER PURPOSES

Herman Ulanet, Newark, N. J.

Application December 29, 1944, Serial No. 570,409

2 Claims. (Cl. 219—19)

This invention relates to means of thermal control for setting glue or other adhesive utilized for joining the elements of structural assemblies or for other purposes; and the invention has reference, more particularly, to electrical means operative to apply heat to which the work operated upon is subjected, including magnetic means for controlling such heat application.

In the production of structures provided with framing, supporting, or reenforcing elements to which plywood body parts are to be joined, such e. g. as an aircraft fuselage structure to be covered by a plywood skin, the joining is ordinarily effected by thermo-setting glue or other suitable adhesive applied between the plywood and the structure to which it is to be attached and secured. To this end, the structure and plywood to be assembled is mounted in and clamped together by suitable jigs provided with electrically heated, and usually very thin, ribbon-like heater elements disposed contiguous to the points or areas where a glued joint is to be made. In order to obtain a uniform setting of the glue or other adhesive, and a uniform adherence of the assembled members throughout the area of the glued joint or joints, it is necessary to control the temperature of the applied heat, especially within a given maximum temperature limit, so as to prevent excessive application of heat detrimental to either the glue or adhesive or to the assembled members. Since the mass of the thin ribbon-like heater element per se is relatively small, said element tends to heat rapidly and to cool as rapidly, and consequently control of the temperature thereof by inexpensive ordinary external thermostatic control devices has not been heretofore satisfactorily attained, for the reason that the thermo-responsive elements of such ordinary thermostatic control devices, being of relatively large mass, are not adapted to heat and cool as fast as does the ribbon heater element itself. For this reason, resort has usually been made to use of comparatively highly expensive pyrometric control devices. If e. g. an ordinary thermostatic control device is connected in series with a ribbon heater element, the latter tends to reach a much higher temperature than is needed or is desirable before the thermo-responsive means of the former has time to heat up to the desired predetermined operating temperature at which it functions to interrupt the ribbon-like heater element circuit, and consequently said heater element is permitted to detrimentally overheat. On the other hand, on the cooling cycle of the thermo-responsive means of the ordinary thermostatic control device, due to its greater mass as compared with the small mass of the thin ribbon-like heater element, said thermo-responsive means retains its heat long after the ribbon-like heater element has cooled below a desired minimum limit of heat range, and consequently the thermostatic control device fails to effect closing of the heater element circuit in time to promptly satisfy a call for heat by said element. Such sluggishness in the action of ordinary external thermostatic control devices therefore renders the use thereof impracticable for precise and prompt control of the temperature of the ribbon-like heater element within a desired minimum-maximum range which is best adapted for the rapid and proper setting of glue or other adhesive in the joints of the structure operated upon.

Having the above conditions in view, it is an object of this invention to provide an inexpensive, reliable and prompt acting means for controlling the temperature of small mass electrical heater elements, such as ribbon-like heater elements used in glue joining assembly of plywood with structural parts, wherein the heater element is made of selected material which is responsive to magnetic force when cold or at relatively low temperature, but which becomes non-magnetic at relatively high temperature, and wherein this variation in magnetic response is utilized to open and close a switch through which electrical heating current is served to said heater element, and thus control the temperature of the heating element so that the same is not permitted to overheat or exceed a temperature beyond which detrimental effect upon the work is likely to occur. To this end I employ a heater element made of Invar metal (an alloy comprising substantially 36% nickel and 64% iron), since such Invar metal possesses the properties of being responsive to magnetic force when cold or at a temperature below 300° F. approximately, but becomes non-magnetic or non-responsive to magnetic force at a temperature exceeding approximately 300° F.

Other objects of this invention, not at this time more particularly enumerated, will be understood from the following detailed description of the same.

An illustrative embodiment of this invention is shown in the accompanying drawings wherein work clamping means is provided with a ribbon-like heater element of Invar or equivalent metal which is arranged to cooperate with a magnetically controlled electrical switch means through which heating current is served to said heating element, all in accordance with the principles of this invention.

Referring to the drawing, the reference character P indicates a sheet of plywood which is to be joined by glue joints to a reenforcing rib R. The rib R, in an illustrative form of work clamping jig as shown, is supported by the lower jig or clamp member J'. The plywood P is superposed upon the rib R and pressed firmly into engagement therewith by an upper jig or clamp member J". A layer or coating of glue G is applied to and between the meeting surfaces of the rib R and plywood P. Said upper jig or clamp member J" is provided with a ribbon-like heater element 10 to contact that portion or area of the plywood sheet P which is opposed to the rib R. Said ribbon-like heater element 10 is provided with a suitably extending end portion 10' which is disposed externally of the clamping jig, and a suitable part of which is unyieldingly supported by a stationary supporting means 11. Said heater element 10 is adapted to be electrically heated, and to this end is connected in an electrical circuit adapted to supply current thereto from a suitable source. A magnetically actuated control switch is connected in the circuit by which the heater element is served in series with the latter; the magnetic actuating means of said switch being directly cooperative with an exposed portion of the heater element for the purposes and with the advantages hereinafter referred to.

An illustrative form of magnetically actuated control switch as arranged in novel cooperative relation to a portion of the heater element per se, as shown, comprises a supporting base 12, preferably made of insulating material. Said base 12 is provided at one end with a post 13 to which is suitably affixed or anchored, by one end, a resilient electrically conductive switch arm 14. Affixed to the free end portion of said switch arm 14 is a contact piece 15. Said base 12 is also provided at its opposite end with another post 16 to which is suitably affixed or anchored, by one end, a second resilient electrically conductive switch arm 17, the free end portion of which is disposed adjacent to the free end portion of said first mentioned switch arm 14. Affixed to the free end portion of said second switch arm 17 is a contact piece 18 adapted to be engaged and disengaged by the contact piece 15 of said switch arm 14.

The electrical switch thus provided is connected in a current supply circuit in series with the heater element 10—10', and to this end an input conductor 19, leading from a suitable source of electrical energy, is connected with the switch arm 14. From the switch arm 17 extends a conductor 20 which leads to and is connected with one end of the heater element 10—10', and from the opposite end of the latter extends a conductor 21 leading back to the source of electrical energy.

The described switch means is located adjacent to the exposed end 10' of the heater element, and affixed to the resilient switch arm 14 is a magnet 22 which is opposed to an adjacent body portion of said heater element. This magnet may be of the permanent type (as shown), or it may be of the electro-magnetic type, and is electrically insulated in any suitable manner from current carrying parts against any possibility of short circuiting said parts.

In the operation of the control switch, when the heater element 10—10' is cool it is responsive to the magnetic force of the magnet 22, and consequently an attractive force is exerted whereby the magnet is pulled into contact with the heater element, and thus maintained in contact therewith until under influence of heat generated in said heater element, the latter loses its responsiveness to magnetic force. When and so long as the magnet 22 and heater element are held engaged by magnetic attraction, a pull by the magnet upon the switch arm 14 will be exerted which swings said switch arm 14 toward the switch arm 17, thereby bringing their contact pieces 15—18 into engagement, whereby to close the switch to current flow and consequently delivery of current through the heater element 10—10' (such closed condition of the switch being shown by full lines in the drawing).

While the control switch is closed, the electrical energy delivered through the heater element 10—10' causes the temperature thereof to rise, and the heat thus generated is transferred to the work whereby to act upon and set the thermo-setting glue G employed to bind together the plywood P and rib R.

As above stated, the heater element is made of Invar metal or metal of like characteristics. This Invar metal possesses a relatively high specific resistance; it is also of such character that it does not substantially expand at relatively high temperatures, e. g. up to 350° F. In addition to these characteristics, which well fit the Invar metal for use as an electrical heater element, such Invar metal possesses the further characteristic that it is responsive to magnetic force when cool or at a temperature below approximately 300° F., but when heated to a temperature of approximately 300° F., or in excess thereof, it becomes non-magnetic. This latter characteristic is taken advantage of in the present invention, since it so happens that a temperature up to approximately 300° F. provides a satisfactory heat application for setting a thermo-setting glue, which glue, however, is likely to be detrimentally effected by heat much in excess of 300° F. It will thus be understood that so long as the temperature of the heater element does not substantially exceed 300° F., the control switch remains closed, and heating current will be continued to be served to the heater element. When, however, the heater element attains a temperature of approximately 300° F., it becomes non-magnetic, and no longer responsive to magnetic force of the magnet 22, so that the latter being no longer attracted thereby, said magnet is released, whereupon the stored elastic stress set up in the switch arm 14 is released, and said switch arm separates from its engaged relation to the switch arm 17, thus interrupting delivery of heating current to the heater element (such open condition of the switch being shown by dotted lines in the drawings).

When for lack of heating current, the temperature of the heater element drops, and on thus cooling its responsiveness to magnetic force is restored, the magnet 22 will again be attracted to and will engage the heater element so as to again close the switch arms 14—17, thus causing delivery of heating current to the heater element to be resumed. This cycle of operation is automatic and will continue until the work is completed by proper setting of the glue G.

The thermal control means may be provided with means for regulating its action so as to be responsive, within limits, to temperatures of selected maximum degree. To this end a bracket 23 affixed to the post 16 is positioned above the free end portion of the switch arm 14. Threaded through said bracket 23 is an adjusting or regulator screw 24. By manipulating said screw 24, the air gap between the magnet 22 and heater element portion 10' may be varied, thereby relating the timing of the switch operation to the degree of magnetic force effective between said magnet and heater element at a given temperature of the latter.

From the above it will be understood that the heater element itself serves as the thermo-sensitive means for controlling supply of heating current thereto, and consequently not only is the control system efficiently automatic, but is prompt and precise in action, so that an assured control of the temperature of the heater element is obtained, and excessive temperature rises are positively prevented.

Although the magnetic temperature control means of this invention is especially well adapted for use in controlling the temperature of electrically heated heater elements of jigs used to glue join assemblies of plywood and associated structural parts, it will be understood that the control means may also be used in connection with electrically heated heater elements employed in other types of apparatus for other specific purposes.

Having now described my invention, I claim:

1. In jig means for glue joining assembled structural members, opposed clamp devices between which said members are engaged and held together, at least one of said clamp devices having a ribbon-like heater element for contiguous application to areas of said members to be joined, said heater element consisting in a metal having a substantial specific resistance and being responsive to magnetic force at relatively low temperatures but non-magnetic at a relatively high temperature, a switch means comprising a movable switch arm and a cooperating relatively stationary switch arm, said switch means and heater element being connected in series in an electrical circuit, a magnet affixed to said movable switch arm, and said heater element having a portion exposed and opposed to said magnet, whereby when the heater element at relatively low temperature is responsive to magnetic force said magnet will be attracted thereto and held thereby to hold said switch means closed, but when said heater element at relatively high temperature becomes non-magnetic said magnet will be released to thereby permit said switch means to open.

2. In jig means for glue joining assembled structural members, opposed clamp devices between which said members are engaged and held together, at least one of said clamp devices having a ribbon-like heater element for contiguous application to areas of said members to be joined, said heater element consisting in a metal having a substantial specific resistance and being responsive to magnetic force at relatively low temperatures but non-magnetic at a relatively high temperature, a switch means comprising a movable switch arm and a cooperating relatively stationary switch arm, said switch means and heater element being connected in series in an electrical circuit, a magnet affixed to said movable switch arm, said heater element having a portion exposed and opposed to said magnet, whereby when the heater element at relatively low temperature is responsive to magnetic force said magnet will be attracted thereto and held thereby to hold said switch means closed, but when said heater element at relatively high temperature becomes non-magnetic said magnet will be released to thereby permit said switch means to open, and means for adjusting the spaced relation of said magnet in open switch position to said opposed heater element portion, whereby to select, within limits, the temperature point at which the heating circuit will be interrupted.

HERMAN ULANET.

REFERENCES CITED

The following references are of record in the file of this patent:

UNITED STATES PATENTS

| Number | Name | Date |
|---|---|---|
| 1,499,112 | Lippincott | June 24, 1924 |
| 1,725,255 | Claytor | Aug. 20, 1929 |
| 2,102,487 | Schwarz | Dec. 14, 1937 |